United States Patent [19]

Brooks

[11] Patent Number: 4,684,423
[45] Date of Patent: Aug. 4, 1987

[54] METHOD FABRICATING A COLLAPSIBLE MANDREL STRUCTURE TO BE USED IN MANUFACTURING REINFORCED HOLLOW TANKS

[75] Inventor: John C. Brooks, West Valley City, Utah

[73] Assignee: Edo Corporation/Fiber Science Division, Salt Lake City, Utah

[21] Appl. No.: 828,213

[22] Filed: Feb. 10, 1986

[51] Int. Cl.$^4$ ............................................. B65H 81/02
[52] U.S. Cl. ................................... 156/156; 156/171; 156/174; 156/196; 156/213; 156/215; 156/250; 156/281; 156/304.2; 156/307.5; 156/307.7; 156/331.6; 249/65
[58] Field of Search ............... 156/156, 171, 173, 196, 156/212, 213, 307.5, 331.6, 304.2, 174, 170, 281, 215, 307.7, 250; 249/65; 242/72 B; 279/2 B

[56] References Cited

U.S. PATENT DOCUMENTS

| | | | |
|---|---|---|---|
| 1,771,861 | 7/1930 | Penfold | 156/213 |
| 2,157,580 | 5/1939 | Voit et al. | 156/213 |
| 2,482,702 | 9/1949 | Billmeyer | 156/174 |
| 2,509,882 | 5/1950 | Roberts | 156/196 |
| 2,688,488 | 9/1954 | Crowley | 156/212 |
| 2,717,849 | 9/1955 | Rempel et al. | 156/196 |
| 3,070,479 | 12/1962 | Meyer | 156/196 |
| 3,210,228 | 10/1965 | Bluck | 156/173 |
| 3,497,587 | 2/1970 | Ikeda et al. | 156/173 |
| 3,610,563 | 10/1971 | Allen | 249/65 |
| 4,204,897 | 5/1980 | Bartell | 156/304.2 |
| 4,242,160 | 12/1980 | Pinter et al. | 156/425 |
| 4,463,044 | 7/1984 | McKinney | 156/174 |

*Primary Examiner*—Jerome Massie
*Attorney, Agent, or Firm*—Thorpe, North & Western

[57] ABSTRACT

A method of constructing a collapsible mandrel for use in fabricating filament wound vessels or tanks includes the steps of preparing a rigid mandrel and supporting the mandrel on a rotatable axle, applying one or more layers of strips of rubber longitudinally on the mandrel to form an enclosure, applying coats of rubber solution over the layers, winding a layer of fibers over at least one of the layers, and curing the rubber layers. The layers are cut into two parts, removed from the rigid mandrel, and rejoined by using reinforcing straps along the seam of the joined parts. The collapsible mandrel may be used to fabricate either filament wound tanks or other collapsible mandrels, neither of which would have a seam or joint since, after constructing the tank or second mandrel on the first inflated collapsible mandrel, the first mandrel would be deflated, collapsed and removed from the interior of the tank or second mandrel. This would leave a tank or second mandrel with continuous, unbroken layers forming the shell.

27 Claims, 10 Drawing Figures

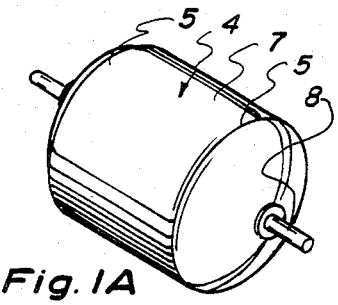
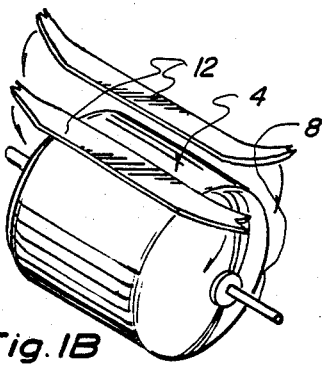
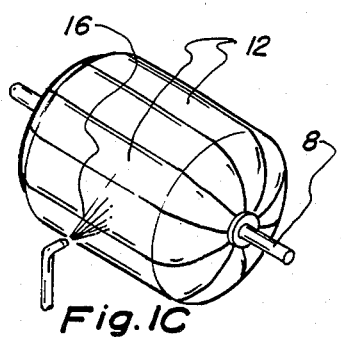
Fig. 1A  Fig. 1B  Fig. 1C
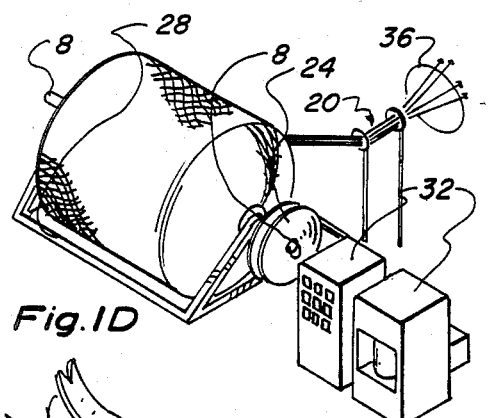
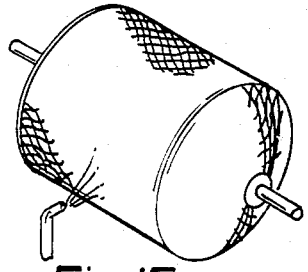
Fig. 1D  Fig. 1E
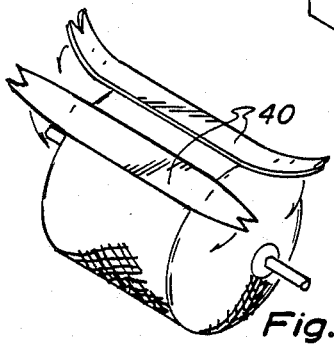
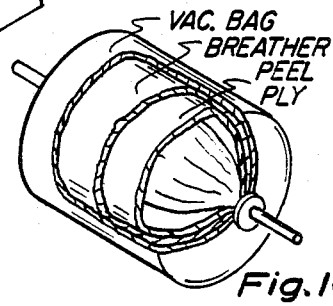
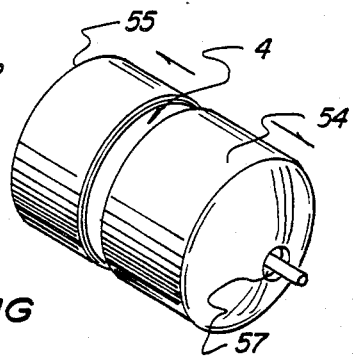
Fig. 1F  Fig. 1G  Fig. 1H
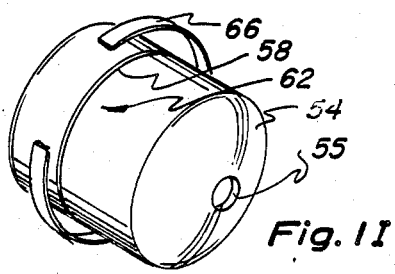
Fig. 1I
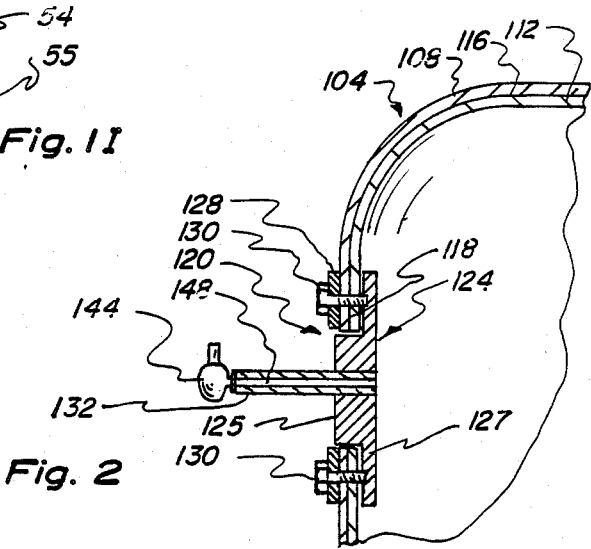
Fig. 2

METHOD FABRICATING A COLLAPSIBLE MANDREL STRUCTURE TO BE USED IN MANUFACTURING REINFORCED HOLLOW TANKS

BACKGROUND OF THE INVENTION

The present invention relates to an inflatable, collapsible mandrel for use in constructing and fabricating filament wound vessels and tanks, and a method of constructing such a mandrel.

Methods of constructing filament wound vessels, tanks and containers are well known in the prior art. Typically, a rigid mandrel made of aluminum, resin impregnated and coated fiberglass or other high strengh, relative lightweight filament, or the like is prepared and mounted on a winding machine so that the mandrel may be selectively rotated. The surface of the mandrel is coated with an appropriate mold release solution and then wound with resin impregnated or coated filaments, such as glass, Kevlar, graphite, nylon or boron, for example, with the winding progressing from end to end, for an elongated mandrel, or from side to side, for a more spherical mandrel. When the desired thickness of the winding layers is achieved, the winding is stopped and the resin is cured.

The resulting filament wound vessel is removed from the mandrel by cutting the vessel circumferentially, at a location near the center thereof, to penetrate to the mandrel. The two halves of the vessel are then removed from the mandrel and the halves joined and bonded together to form the desired vessel or tank. A short helical wind of a resin coated filament strand or roving may be made over the joint of the vessel to further secure the two halves together.

Examples of prior art winding techniques and methods are disclosed in U.S. Pat. Nos. 3,386,872, 3,412,891, 3,697,352, 3,692,601, 3,533,869, 3,502,529 and 3,414,449.

Because of the joint in the completed vessel, an inherent weakness exists which may be the first to fail or fracture when the vessel is subjected to pressure or stress. It would be desirable for the shell of the vessel to be continuously wound with no breaks or joints to better preserve the integrity and strength of the structure and the ability of the structure to withstand stress. Providing a mandrel which somehow could be removed from the interior of the vessel without cutting the vessel would appear to provide a solution.

SUMMARY OF THE INVENTION

It is an object of the invention to provide a new and improved mandrel structure for use in fabricating filament wound hollow vessels and tanks, and a method of constructing such a structure.

It is also an object of the invention to provide such a mandrel structure which may be collapsed for easy removal of the mandrel from the hollow vessel being constructed.

It is a further object of the invention to provide a new and improved method of fabricating a filament wound hollow vessel utilizing a collapsible mandrel.

It is an additional object of the invention to provide such a method which enables fabrication of a vessel which is continuously wound, with no joints or breaks.

The above and other objects of the invention are realized in accordance with the structure and method of the invention in which a hollow, collapsible mandrel is supported on a winding machine, with the mandrel including at least one opening through which gas may be supplied to inflate the mandrel, or removed to deflate and collapse the mandrel. Gases are supplied to the mandrel under pressure to inflate it to a distended condition. The mandrel is then coated with an appropriate mold release solution, after which layers of windings of high strength resin impregnated filament are placed on the mandrel to produce the desired hollow vessel having an opening at least at one end. The resin is then cured to rigidify the vessel. The gases are removed from the mandrel to cause it to collapse and the mandrel is then withdrawn from the interior of the vessel through the opening. The result is a filament wound hollow vessel having no joints or cuts, and a mandrel which can be reused.

The collapsible mandrel used to construct the filament wound vessel is a hollow enclosure constructed of at least one layer of cured rubber and a layer of fibers wound about the layer of rubber. Advantageously, a second layer of rubber is placed over the layer of fibers and cured to provide a mandrel which may be inflated under pressure, or deflated to a collapsed condition as needd for removal from the interior of a filament wound vessel.

BRIEF DESCRIPTION OF THE DRAWINGS

The above and other objects, features and advantages of the invention will be apparent from a consideration of the following detailed description presented in connection with the accompanying drawings in which:

Composite FIG. 1 is a graphical flow chart showing the steps of the method of constructing a collapsible mandrel in accordance with the principles of the present invention; and FIG. 2 is a cross-section of an end portion of a collapsible mandrel mounted for filament winding a hollow vessel thereon.

DETAILED DESCRIPTION

Referring to FIG. 1, there is shown the sequence of the principal steps of the method of constructing a collapsible mandrel for use in fabricating filament wound hollow vessels. FIG. 1A of the sequence shows a rigid, generally elongate mandrel 4 supported on a rotatable axle 8 which extends longitudinally through the center of the mandrel. As will be noted later, the axle 8 would be used to mount the mandrel 4 in a winding machine.

The mandrel 4 may be constructed in any conventional and known fashion and be of various sizes and shapes. Preferably the mandrel 4 would be hollow or foam filled, with machined and/or molded ends 5 and a center cylindrical section 7. The parts of the mandrel 4 could, for example, be made of aluminum, resin impregnated and coated fiberglass or other high strength relatively lightweight filament, or the like.

Before beginning construction of the collapsible mandrel on the mandrel 4, the mandrel 4 would be coated with an appropriate mold release solution to prevent adherance to the mandrel of subsequent layers placed thereover. Suitable mold release solutions are well known in the art and readily available.

The mandrel 4 is then painted or sprayed with a rubber solution composed of methyl ethyl ketone and uncured nitrile rubber. Advantageously, the composition comprises one gallon of methyl ethyl ketone and two pounds by weight of uncured nitrile rubber. The methyl ethyl ketone is allowed time, for example twenty-four hours, to evaporate from the solution.

FIG. 1B illustrates the next step in the process of placement of strips 12 of uncured nitrile rubber in the longitudinal direction, and adjacent to one another on the mandrel 4. The strips 12, after placement on the mandrel 4, would extend from near the axle 8 at one end, up and over the mandrel 4, to a location near the other end of the axle. The strips 12, advantageously, have a thickness of about 0.020 inches, and a width at the thickest part of about 12 to 24 inches. The strips 12 are layed adjacent to one another either so that adjacent strips overlap or so that adjacent edges of the strips generally abut to form joints. If overlapped, preferably each strip would overlap the adjacent strip by about 0.25 inches.

Although the strips 12 were described as being made of uncured nitrile rubber, natural rubber or other suitable resilient material, such as neoprene rubber, could be utilized.

In FIG. 1C of the sequence, another coat of methyl ethyl ketone and nitrile rubber solution 16 is applied, either by spraying (as shown) or painting, onto the first layer of rubber strips 12. Again, the methyl ethyl ketone is allowed to evaporate over approximately a 24 hour period. Although not shown in the FIG. 1, after the rubber solution is applied to the layer of rubber strips 12, the rubber is cured in a well known fashion illustrated in FIG. 1G, to be discussed later.

In FIG. 1D, the mandrel is shown mounted on a winding machine 20 of conventional design. Illustratively, the winding machine 20 includes a drive gear 24 fixed onto the end of the axis 8 which is rotatably mounted in a frame 28. Control equipment 32 controls the rotation and winding process for winding fibers or filaments 36 onto the mandrel mounted on the machine. In the process of the present invention, fibers 36 are wound over the first layer of rubber to serve as reinforcement for the collapsible mandrel being constructed. Advantageously, the fibers are alternately wound at different winding angles, for example, one layer circumferentially (90° hoop) and one layer helically at an angle of about twenty-three degrees. Preferably the fibers 36 are composed of 1/16 inch Kevlar fibers with a space wind of ⅛ inch, but other high strength fibers could also be used.

FIG. 1E shows a third coat of methyl ethyl ketone and nitrile rubber solution being sprayed or painted over the fiber reinforcement. This could, however, be done while the winding step, shown in FIG. 1D, were taking place. In either case, the methyl ethyl ketone would be allowed to evaporate, as before discussed. Then, a rubber and textile adhesive, such as Kemlok 402, is applied over the surface of the filament and rubber by painting or spraying.

A second layer of uncured nitrile rubber strips 40 is applied over the filament reinforcement layer, as indicated in FIG. 1F. The strips 40 are placed to overlie joints or edges of the first layer of strips 12 put in place in the step illustrated in FIG. 1C. Placement of the strips 40 over the joints or edges of the underlying layer serves to strengthen the resulting mandrel produced by the process.

A fourth coat of methyl ethyl ketone and nitrile rubber solution is applied to the second layer of rubber strips 40 and allowed to sit for about 24 hours to allow evaportion of the methyl ethyl ketone.

FIG. 1G illustrates the curing process for curing the layers of rubber strips. This process, which is conventional and which is carried out following application of each layer of rubber strips and spraying of the methyl ethyl ketone and nitrile rubber solution over the strips, involves the placement of a peel ply layer (release film), a breather layer (to allow removal of air and volatiles from around the mandrel) and a nylon vacuum bag about the mandrel. The mandrel is then placed under vacuum and cured in an oven at about 325° Fahrenheit for about 3 hours. After curing is completed, the bag material is removed from about the mandrel.

Depending upon the thickness desired for the resulting collapsible mandrel, the steps illustrated in FIGS. 1C through 1G could be repeated as necessary. When the desired thickness of rubber is obtained, the next step in the process would be as illustrated in FIG. 1H, that of removing the resulting collapsible mandrel 54 from the rigid mandrel 4. This is done by cutting the collapsible mandrel 54 circumferentially as indicated in FIG. 1H. The two parts of the collapsible mandrel 54, each of which have end openings 55 and 57, are then removed from the rigid mandrel 4 and rejoined and bonded together as shown in FIG. 1I using a cured fiber reinforced nitrile rubber strap 66. To facilitate this, a resilient ring made, for example, of fiberglass and having a width of about ten inches, is placed through an end opening inside the mandrel underneath the seam 58 (formed between the two halves) to hold the mandrel outwardly and provide some rigidity to enable vulcanizing the strap 66 over the seam. After curing the rubber strap 66 on the outside of the seam 58, the resilient ring is removed from the collapsible mandrel, and the mandrel is turned inside out. A second rubber strap is then vulcanized over the seam on the opposite side from the first strap. For a mandrel ten feet long and five feet in diameter, the reinforcing straps would advantageously be about ten inches in width. The shell of the completed mandrel of this size advantageously would have a thickness of about 0.150 inches.

The completed collapsible mandrel may then be tested for weaknesses or breaks by inflating the mandrel under pressure. Any discovered breaks or leaks could then accordingly be corrected by patching, spraying the interior with a rubber solution, or similar repairing process.

The collapsible mandrel produced with the described method can be used to produce another collapsible mandrel which would not have the circumferentially positioned seam since the second mandrel would not have to be cut, separated and rejoined. Similarly, the mandrel produced by the above described process could be used to construct filament wound hollow vessels which likewise would not have to be cut and then rejoined. Fabricating a filament would hollow vessel would generally proceed through the sequence of steps as will next be described.

FIG. 2 shows a fragmented, cross-sectional view of an end portion of a collapsible mandrel 104 comprised of two layers 108 and 112 of rubber strips between which is sandwiched filament winding reinforcement 116. The mandrel 104 is prepared for use by mounting a plate and ring on respective ends of the mandrel. In the end portion of the mandrel shown in FIG. 2, the perimeter 118 of the end opening 120 of the mandrel is sandwiched between an end plate 124 and ring 128. The end plate 124 which includes a raised, thicker central section 125 and a thinner outer section 127, is mounted on an axle 132. The perimeter 118 of the end opening 120 of the mandrel is placed over the thinner outer section 127 of the end plate 124 so that the raised portion 125 projects through the end opening 120. The ring 128 is then placed over the perimeter 118 and joined by bolts 130 to the end plate 124. A swivelable valve 144 is mounted on the end of axle 132 to allow supplying of gas through a central bore 148 in the axle to the interior of the mandrel 104, and the withdrawal of gas therefrom. Such a valve arrangement is of conventional design.

Initially, the mandrel would be inflated to a pressure of about 4 pounds per square inch and the mandrel would be mounted on a winding machine, being supported by axles such as axle 132 of FIG. 2. The mandrel would then be prepared for winding a filament thereon, for example, including the application of a mold release solution to the exterior of the mandrel, winding a composite structure on the mandrel utilizing a high strength filament such as glass, Kevlar, graphite, nylon, boron, etc. which has been impregnated with resin, and curing the resin. During the winding process, in order to maintain the size and shape of the collapsible mandrel, the pressure in the mandrel is increased from about 4 pounds per square inch to about 9.5 pounds per square inch as the winding process is being concluded. The mandrel is then deflated (by withdrawing air through valve 144 [FIG. 2]) to cause it to collapse within the completed filament wound vessel so that it can be withdrawn from the interior of the vessel through one of the end openings of the vessel. The mandrel may then be used for another winding.

With the above described method and structure, filament wound vessels and tanks may be produced without seams, joints or breaks to provide a more sturdy and failure resistant tank. The method of constructing the collapsible mandrel is simple and yet yields a mandrel which can be used to fabricate either other collapsible mandrels or filament wound tanks, and can be reused many times.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangments. For example, placement of a strap over the seam 58 in FIG. 1I could be carried out by a person entering the opening 55 of the mandrel, and placing a strap over the seam on the inside of the mandrel. A second strap could then be placed over the seam on the outside of the mandrel and the two straps vulcanized in place.

What is claimed is:

1. A method of constructing a collapsible mandrel for using in fabricating filament wound vessels or tanks, said method comprising the steps of
   (a) preparing a rigid mandrel and supporting the mandrel on a rotatable axle,
   (b) applying a first layer of strips of rubber longitudinally on the mandrel to form an enclosure with oppositely disposed openings coincident with the axle,
   (c) applying a coat of rubber solution substantially uniformly over the strips of rubber,
   (d) winding fibers onto the coat of rubber solution,
   (e) applying a second layer of strips of rubber longitudinally over the fibers,
   (f) curing the rubber layers,
   (g) cutting the rubber layers circumferentially into two parts and separating the parts from the rigid mandrel,
   (h) rejoining said two parts along the cut made in step (g),
   (i) bonding said two parts together by placing and curing strips of rubber over the seam separating said two parts on the outside and inside of the seam, to form the collapsible mandrel.

2. A method as in claim 1 further comprising the step of curing the rubber after step (c).

3. A method as in claim 1 wherein steps (b) and (e) comprise overlapping adjacent strips of rubber in each layer.

4. A method as in claim 3 wherein step (e) comprises placing strips of rubber of the second layer so that they overlie edges of the strips of rubber of the first layer.

5. A method as in claim 1 wherein steps (b) and (e) comprise placing adjacent strips of rubber of each layer together so that adjacent edges of the strips generally abut to form joints.

6. A method as in claim 5 wherein step (e) comprises placing strips of rubber of the second layer so that they overlie the joints of the first layer.

7. A method as in claim 1 further including applying a coat of rubber solution to the rigid mandrel prior to step (b), and applying a coat of rubber solution onto the fibers after step (d), and applying a coat of rubber solution onto the strips of rubber after step (e).

8. A method as in claim 7 wherein said steps of applying rubber solutions comprise brushing on the solutions.

9. A method as in claim 7 wherein said steps of applying rubber solution comprise spraying on the solutions.

10. A method as in claim 7 wherein said rubber solutions comprise a composition of methyl ethyl ketone and uncured nitrile rubber.

11. A method as in claim 10 wherein said rubber solution comprises a mixture of two pounds of nitrile rubber for each gallon of methyl ethyle ketone.

12. A method as in claim 10 further comprising the steps of allowing the methyl ethyl ketone to evaporate from the rubber solutions after application of each coat of solution.

13. A method as in claim 7 further including the step of applying a coat of rubber and textile adhesive following application of the rubber solution onto the fibers.

14. A method as in claim 1 wherein the strips of rubber comprise nitrile rubber.

15. A method as in claim 14 wherein the strips of rubber are about 0.020 inches thick and from about 12 inches to 24 inches wide at the widest part, and wherein the resulting collapsible mandrel is about five feet in diameter.

16. A method as in claim 1 wherein step (d) comprises winding the fibers alternately at different winding angles.

17. A method as in claim 16 wherein step (d) comprises winding the fibers with some layer(s) of circumferentially wound strands and some layer(s) of helically wound strands.

18. A method as in claim 1 wherein the fibers comprise kevlar strands of about one-sixteenth inch in diameter.

19. A method as in claim 18 wherein step (d) further comprises applying a solution of rubber to the fibers and strips of rubber as the winding is taking place.

20. A method as in claim 1 wherein step (i) comprises
   (j) placing a ring inside the collapsible mandrel to support and distend the seam of the mandrel,
   (k) placing and curing a strip of rubber over the seam on the outside of the collapsible mandrel,
   (l) removing the ring from inside the collapsible mandrel,
   (m) turning the collapsible mandrel inside-out, and
   (n) repeating steps (j) through (l) for the seam on the side now on the outer surface of the collapsible mandrel.

21. A method as in claim 1 wherein step (i) comprises placing and curing a strip of rubber over the seam on the inside of the mandrel and then placing and curing a strip of rubber over the seam on the outside of the mandrel.

22. A method of fabricating a hollow tank using the collapsible mandrel of claim 1 comprising the steps of
   (o) supporting the collapsible mandrel on a winding machine so that the mandrel is distended,
   (p) placing a layer of material on the exterior of the collapsible mandrel to form a hollow tank with openings at opposite ends thereof,
   (q) curing the material,
   (r) collapsing the mandrel within the hollow tank, and
   (s) removing the collapsible mandrel from the hollow tank through one of said openings in the tank.

23. A method as in claim 22 wherein steps (p) and (q) comprise performing steps (b) through (f) of claim 1.

24. A method as in claim 22 wherein steps (p) and (q) comprise
   winding a composite structure on the collapsible mandrel utilizing a high strength filament, the composite structure being impregnated with resin, and curing the resin.

25. A method as in claim 22 wherein step (o) comprises
   placing the perimeters of the two opposed openings of the collapsible mandrel between respective combinations an end plate and a ring to secure the end plates over the openings,
   mounting the end plates on a rotatable axle of the winding machine, and
   inflating the collapsible mandrel under pressure to a distended condition.

26. A method as in claim 25 wherein step (p) further includes increasing the inflation pressure of the collapsible mandrel as the layers of material are placed on the mandrel.

27. A method as in claim 25 wherein step (r) comprises deflating the collapsible mandrel to allow it to collapse within the tank.

* * * * *